(12) United States Patent
Morrison et al.

(10) Patent No.: US 6,382,357 B1
(45) Date of Patent: May 7, 2002

(54) RETAIL SYSTEM FOR ALLOWING A CUSTOMER TO PERFORM A RETAIL TRANSACTION AND ASSOCIATED METHOD

(75) Inventors: James Morrison, Suwanee; John C. Addy, Lawrenceville, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/211,688

(22) Filed: Dec. 14, 1998

(51) Int. Cl.[7] .................................................. G07G 1/14
(52) U.S. Cl. .......................... 186/61; 235/383; 235/385
(58) Field of Search ............................ 186/61; 235/383, 235/385

(56) References Cited

U.S. PATENT DOCUMENTS

| | | | | |
|---|---|---|---|---|
| 3,749,191 A | * | 7/1973 | Ashen et al. | 235/383 |
| 3,878,365 A | * | 4/1975 | Schwartz | 235/383 |
| 4,787,467 A | * | 11/1988 | Johnson | 235/383 |
| 5,250,789 A | * | 10/1993 | Johnsen | 235/383 |
| 5,397,882 A | * | 3/1995 | Van Solt | 235/383 |
| 5,488,202 A | * | 1/1996 | Baitz et al. | 177/50 |
| 5,825,002 A | * | 10/1998 | Roslak | 235/383 |
| 5,877,485 A | * | 3/1999 | Swartz | 186/61 |
| 5,883,968 A | * | 3/1999 | Welch et al. | 382/100 |
| 5,898,158 A | * | 4/1999 | Shimizu | 286/61 |

FOREIGN PATENT DOCUMENTS

| | | | | |
|---|---|---|---|---|
| EP | 390448 | * | 10/1990 | G07G/1/00 |
| GB | 2068132 | * | 8/1981 | |
| GB | 2307575 | * | 5/1997 | G06K/17/00 |
| GB | 2311395 | * | 9/1997 | G06K/17/00 |

* cited by examiner

Primary Examiner—Eileen D. Lillis
Assistant Examiner—Thuy V. Tran
(74) Attorney, Agent, or Firm—Maginot, Addison & Moore

(57) ABSTRACT

A method of operating a retail system so as to allow a customer to perform a retail transaction, with the retail system having a hand-held scanner device and a self-service checkout terminal, includes the step of storing a first number of records corresponding to a number of items in a scanner memory device of the hand-held scanner device when the customer scans the number of items with the hand-held scanner device. The method also includes the step of transferring the first number of records from the scanner memory device to a terminal memory device of the self-service checkout terminal and generating a transfer-complete control signal in response thereto. The method further includes the step of determining if the retail transaction of the customer is to be audited in response to generation of the transfer-complete control signal and generating an audit-required control signal in response thereto. Moreover, the method includes the step of operating the self-service checkout terminal so as to allow the customer to enter the number of items into the self-service checkout terminal in response to generation of the audit-required control signal. A retail system is also disclosed.

19 Claims, 6 Drawing Sheets

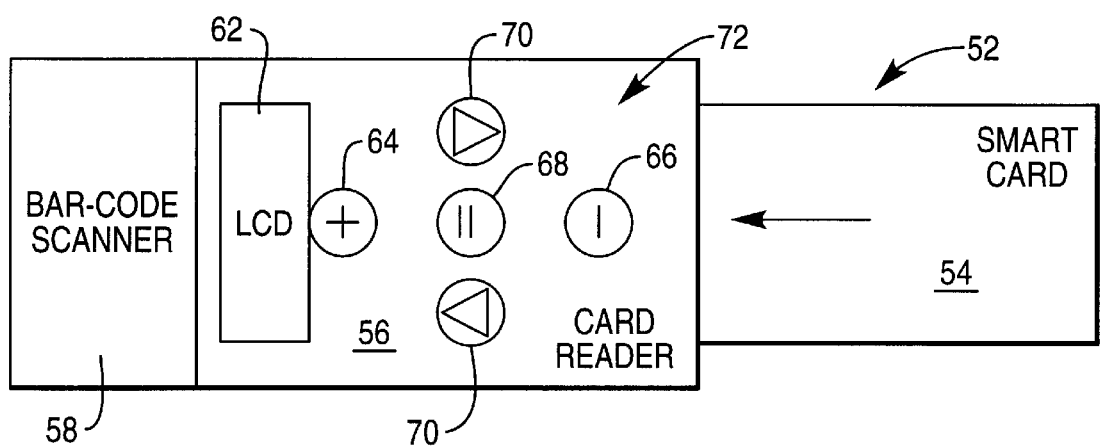
FIG. 1
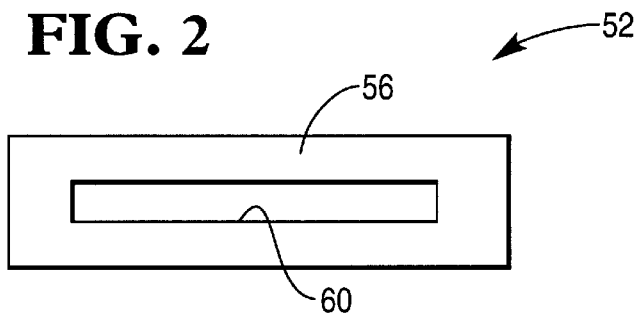
FIG. 2
FIG. 6
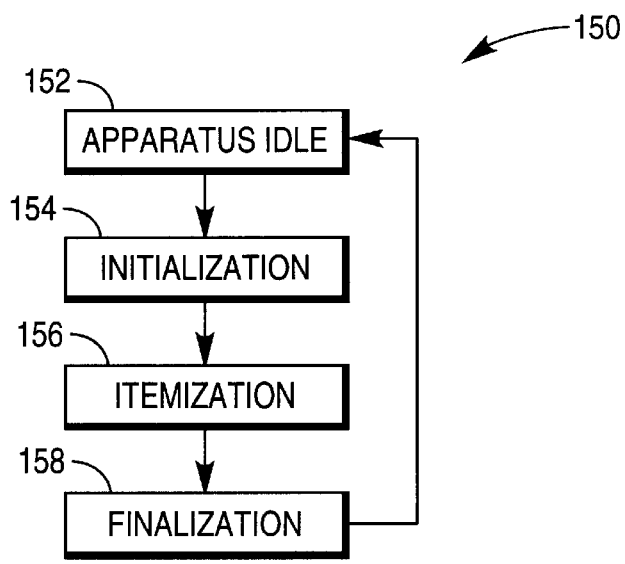

RETAIL SYSTEM FOR ALLOWING A CUSTOMER TO PERFORM A RETAIL TRANSACTION AND ASSOCIATED METHOD

CROSS REFERENCE

Cross reference is made to copending U.S. patent application Ser. No. 09/211,689, entitled "Hand-Held Scanner Device Having a Smart Card Associated Therewith and Associated Method" by Jim Morrison, which is assigned to the same assignee as the present invention, and which is filed concurrently herewith.

TECHNICAL FIELD OF THE INVENTION

The present invention relates generally to a retail system, and more particularly to a retail system for allowing a customer to perform a retail transaction and associated method.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout concepts developed which attempt to substantially eliminate the need for a checkout clerk.

One such self-service checkout concept is a "scan-in-the-aisle" retail system in which the customer scans or otherwise itemizes his or her items for purchase in the shopping area of the retailer's store. What is meant herein by the term "customer" is a person who enters the retailer's store, selects his or her items for purchase from the shopping area of the store, checks out his or items for purchase, tenders payment for his or her items for purchase, and then exits the store subsequent to tendering payment. Hence, as used herein, a customer is distinguished from a retail checkout clerk or other employee of the retailer in that a customer enters the retailer's store for the sole purpose of purchasing items from the store.

Hence, in particular regard to operation of a scan-in-the-aisle retail system, the customer scans individual items for purchase with a portable, hand-held scanner device in the shopping area of the retailer's store as the customer selects such items for purchase from a shelf or the like. For example, the customer may scan each of his or her items for purchase with the hand-held scanner device as the customer places each item into his or her shopping cart or shopping hand basket. A memory device associated with the hand-held scanner device maintains a list which includes each of the items scanned by the customer. Once the customer has selected all of his or her items for purchase (and hence has scanned all of the same with the hand-held scanner device), the customer proceeds to the checkout area of the retailer's store where the customer places the hand-held scanner device into a data downloading interface in which the list of scanned items is downloaded from the memory device of the hand-held scanner device to a retail checkout terminal which is operated by a retail clerk employed by the retailer. The downloaded information is then utilized to tally the customer's transaction such that the customer may tender payment for his or her items for purchase and thereafter exit the retailer's store.

Another type of self-service checkout concept is a retail terminal known as a self-service checkout terminal. A self-service checkout terminal is a system which is located in the checkout area of the retailer's store and is operated by a customer without the aid of a checkout clerk. In operation of a self-service checkout terminal, the customer scans individual items for purchase across a scanner and then places the scanned items into a grocery bag, if desired. The customer then pays for his or her purchases either at the self-service checkout terminal if so equipped, or at a central payment area which is staffed by a store employee. Thus, a self-service checkout terminal permits a customer to select, itemize, and in some cases pay for his or her purchases without the assistance of the retailer's personnel.

A customer typically has little or no training in the operation of a scan-in-the-aisle retail system or a self-service checkout terminal prior to his or her initial use thereof. Hence, one concern that retailers have when evaluating a self-service checkout concept is the level of supervision provided to inexperienced customers. Moreover, it is also known that some customers may have improper intentions when using a scan-in-the-aisle retail system or a self-service checkout terminal. In traditional checkout systems, the clerk employed by the retailer to operate the assisted checkout terminal provides a level of security against theft or other improprieties. However, in the case of either a scan-in-the-aisle retail system or a self-service checkout terminal, the system or terminal, respectively, itself must provide the necessary security.

Hence, a number of security measures have been implemented in regard to operation of a scan-in-the-aisle retail system. For example, a customer generally must initially register with the retailer prior to his or her first use of the scan-in-the-aisle retail system. Thereafter, for a predetermined number of visits to the retailer's store, each of the new customer's transactions will be subjected to audit. In particular, prior to exiting the store, the customer must take his or her items to an assisted checkout terminal (i.e. a retail checkout terminal operated by a retail clerk employed by the retailer) so that a retail clerk may remove each of the customer's items for purchase from the grocery bags (if the customer has already bagged the items), and thereafter scan or otherwise enter each of the customer's items in order to confirm the accuracy of the customer's transaction. Such an audit procedure may be conducted for a predetermined number of visits after the customer initially registers with the retailer. For example, the first three times the new customer operates the scan-in-the-aisle retail system, the customer may be subjected to an audit. Moreover, after the initial number of audits (e.g. the first three uses of the scan-in-the-aisle retail system), the customer may be subjected to an audit on a random basis. For example, the customer may have a one-in-seven chance of randomly being selected for an audit in which the retail clerk confirms the accuracy of the customer's transaction.

Such audits are occasionally viewed as intrusive by the customer. In particular, it is known that some customers may feel as if they are not "trusted" by the retailer since the retailer may elect to have a store employee (e.g. a retail clerk) audit the customer's transaction.

Another drawback associated with scan-in-the-aisle retail systems which have heretofore been designed is the hand-held scanner device which is provided for use by the customer. Such heretofore designed hand-held scanner devices are generally large and bulky thereby rendering the scanner relatively inconvenient for use by the customer. Moreover, such heretofore designed hand-held scanner devices are typically expensive thereby undesirably increasing cost associated with implementing a scan-in-the-aisle retail system by a retailer.

What is needed therefore is a self-service checkout concept which overcomes one or more of the above-mentioned drawbacks. What is particularly needed is a scan-in-the-aisle retail system which allows the customer to complete a transaction himself or herself without the assistance of retail personnel even if an audit of his or her transaction is equired. Moreover what is further needed is a hand-held scanner device for use in a scan-in-the-aisle retail system which is less mechanically complex, less expensive to manufacture, convenient to use, and smaller in size relative to hand-held scanner devices which have heretofore been designed.

SUMMARY OF THE INVENTION

In accordance with a first embodiment of the present invention, there is provided a method of operating a retail system so as to allow a customer to perform a retail transaction. The retail system has a hand-held scanner device and a self-service checkout terminal. The method includes the step of storing a first number of records corresponding to a number of items in a scanner memory device of the hand-held scanner device when the customer scans the number of items with the hand-held scanner device. The method also includes the step of transferring the first number of records from the scanner memory device to a terminal memory device of the self-service checkout terminal and generating a transfer-complete control signal in response thereto. The method further includes the step of determining if the retail transaction of the customer is to be audited in response to generation of the transfer-complete control signal and generating an audit-required control signal in response thereto. Moreover, the method includes the step of operating the self-service checkout terminal so as to allow the customer to enter the number of items into the self-service checkout terminal in response to generation of the audit-required control signal.

In accordance with a second embodiment of the present invention, there is provided a retail system for allowing a customer to perform a retail transaction. The retail system includes a hand-held scanner device having a scanner memory device associated therewith. The hand-held scanner is configured to store a first number of records corresponding to a number of items in the scanner memory device when the customer scans the number of items with the hand-held scanner device. The retail system also includes a self-service checkout terminal having (i) a docking receptacle for docking the hand-held scanner device, (ii) a processing unit electrically coupled to the scanner memory device when the hand-held scanner device is positioned in the docking receptacle, and (iii) a terminal memory device electrically coupled to the processing unit. The terminal memory device has stored therein a plurality of instructions which, when executed by the processing unit, causes the processing unit to (a) transfer the first number of records from the scanner memory device to the terminal memory device and generate a transfer-complete control signal in response thereto, (b) determine if the retail transaction of the customer is to be audited in response to generation of the transfer-complete control signal and generate an audit-required control signal in response thereto, and (c) operate the self-service checkout terminal so as to allow the customer to enter the number of items into the self-service checkout terminal in response to generation of the audit-required control signal.

In accordance with a third embodiment of the present invention, there is provided a method of operating a retail system so as to allow a customer to perform a retail transaction. The retail system has a hand-held scanner device and a self-service checkout terminal. The method includes the step of storing a first number of records corresponding to a number of items in a scanner memory device of the hand-held scanner device when the customer scans the number of items with the hand-held scanner device. The method also includes the step of transferring the first number of records from the scanner memory device to a terminal memory device of the self-service checkout terminal and generating a transfer-complete control signal in response thereto. Moreover, the method includes the step of determining if the retail transaction of the customer is to be audited in response to generation of the transfer-complete control signal and generating an audit-required control signal in response thereto. Yet further, the method includes the step of operating the self-service checkout terminal so as to allow the customer to enter the number of items into the self-service checkout terminal in response to generation of the audit-required control signal. In addition, the method includes the step of storing a second number of records corresponding to the number of items in the terminal memory device of the self-service checkout terminal when the customer enters the number of items into the self-service checkout terminal. The method also includes the step of generating an audit-passed control signal if the second number of records matches the first number of records.

In accordance with a fourth embodiment of the present invention, there is provided a method of operating a retail system so as to allow a customer to perform a retail transaction. The retail system has a hand-held scanner device and a self-service checkout terminal, The method includes the step of operating the hand-held scanner device so as to allow the customer to enter a number of items into the hand-held-scanner device. The method also includes the step of determining if the retail transaction of the customer is to be audited and generating an audit-required control signal in response thereto. Moreover, the method includes the step of operating the self-service checkout terminal so as to allow the customer to enter the number of items into the self-service checkout terminal in response to generation of the audit-required control signal.

It is therefore an object of the present invention to provide a new and useful retail system.

It is moreover an object of the present invention to provide an improved retail system.

It is a further object of the present invention to provide a new and useful method of operating a retail system.

It is also an object of the present invention to provide an improved method of operating a retail system.

The above and other objects, features, and advantages of the present invention will become apparent from the following description and the attached drawings.

BRIEF DESCRIPTION OF THE DRAWINGS

FIG. 1 is a diagrammatic plan view of a portable, hand-held scanner device for use in a scan-in-the-aisle retail system which incorporates the features of the present invention therein;

FIG. 2 is a side elevational view of the portable, hand-held scanner device of FIG. 1

FIG. 6 is a flowchart setting forth a general procedure for checking out items with the scan-in-the-aisle retail system of FIGS. 1 and 3;

DETAILED DESCRIPTION OF THE INVENTION

Figure 3:
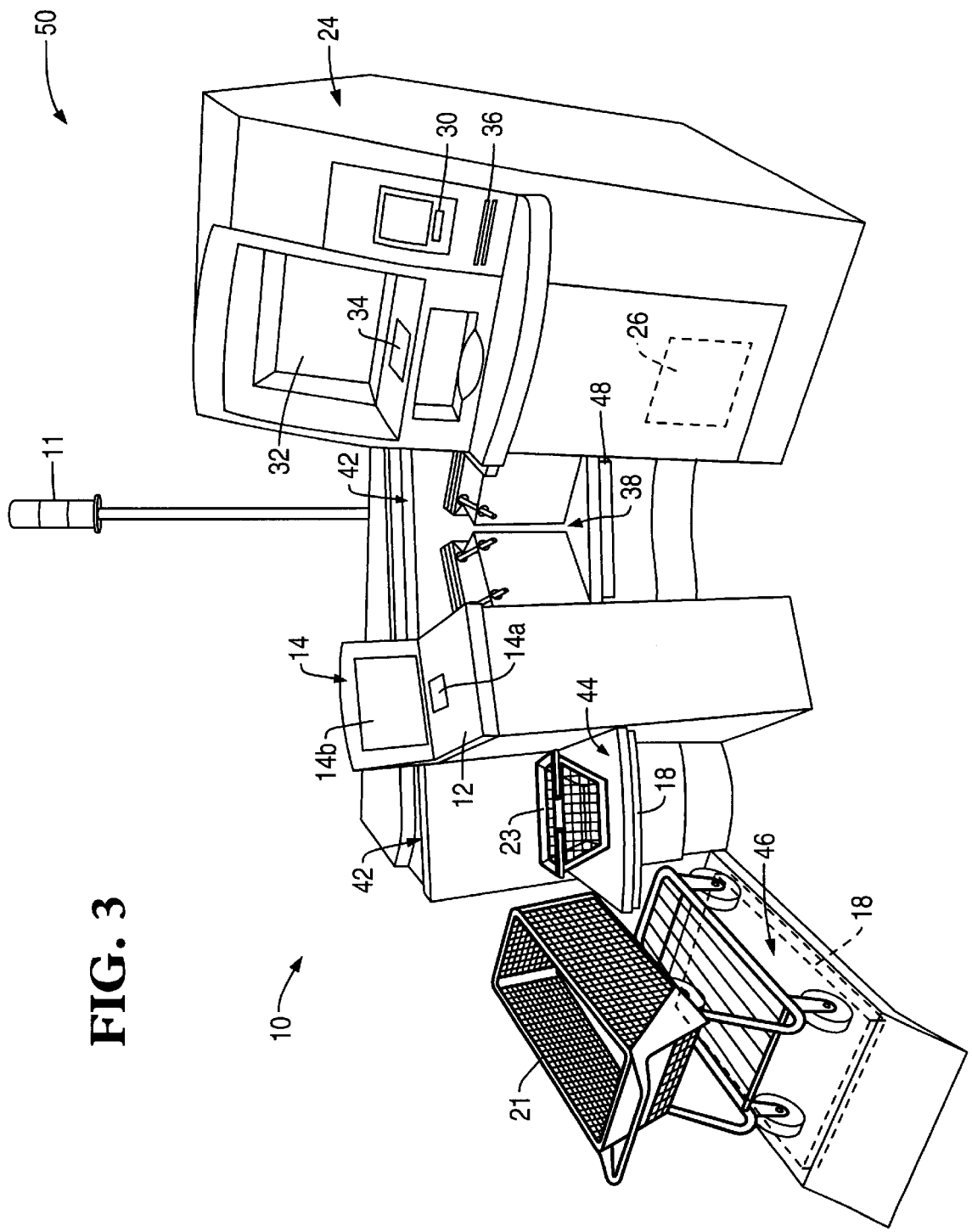
FIG. 3 is a perspective view of a self-service checkout terminal for use in the scan-in-the-aisle retail system which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIGS. 1–5, there is shown a retail system 50 for use in a retail business such as a grocery store. The retail system 50 is a "scan-in-the-aisle" type retail system in which the customer scans or otherwise enters each of his or her items for purchase with a portable, hand-held entry device while shopping in the shopping area of the retailer's store. In particular, the retail system 50 includes a portable, hand-held entry device such as a portable, hand-held scanner device 52 and a retail point-of-sale terminal such as a self-service checkout terminal 10. The hand-held scanner device 52 includes a smart card 54, a smart card reader 56, and a bar code scanner 58.

As shown in FIG. 2, the smart card 54 may be inserted into a slot 60 of the smart card reader 56 in order to be electrically coupled to the smart card reader 56. In particular, the smart card reader 56 includes electrical contacts (not shown) which correspond to electrical contacts (not shown) on the smart card 54 so as to allow communication between the smart card reader 56 and the smart card 54 when the smart card 54 is positioned in the slot 60. The smart card reader 56 may be any known commercially available, portable smart card reader. On such commercially available smart card reader which may be used as the smart card reader 56 of the present invention, with slight modification thereof, is either a model number 844 or a model number 846 Chipcard-Acceptor which is commercially available from Giesecke & Devrient America, Incorporated of Reston, Va. Moreover, the smart card 54 may be embodied as any know smart card. For example, the smart card 54 of the present invention may be embodied as the smart card disclosed in U.S. Pat. No. 5,727,153 issued to Powell or any other commercially available smart card which has the hardware configuration to fit the needs of a given retail system.

The smart card reader 56 also includes a display screen 62 such as an liquid-crystal display (LCD) and a keypad 72 having an add-to-transaction button 64, a void button 66, a total button 68, and a pair of scroll buttons 70. The display screen 62 may be utilized to display information associated with a customer's retail transaction. For example, the display screen 62 may be utilized to display a visual representation of a product identification code when a customer scans a bar code with the hand-held scanner device 52. Moreover, if a customer presses the total button 68, the display screen 62 may be utilized to display the total dollar amount of the items previously scanned by the customer.

The add-to-transaction key 64 may be pressed by the customer in order to add a previously or subsequently scanned item to the customer's transaction. Moreover, the void key 66 may be utilized by a customer to void or otherwise remove a particular item from the customer's checkout transaction. The scroll keys 70 may be utilized by the customer to scroll through the records of items previously scanned by the customer.

The bar code scanner 58 is relatively small, compact bar code scanner and may be embodied as any small, commercially available bar code scanner. For example, the bar code scanner may be embodied as a model number SE 1200 scanner which is commercially available from Symbol Technologies, Incorporated of Holtsville, N.Y. Hence, the bar code scanner may be utilized to scan or read a bar code or the like associated with a product identification code such as a Universal Product Code (UPC), industrial symbol(s), alphanumeric character(s), or other indicia associated with an item to be purchased.

Figure 4:
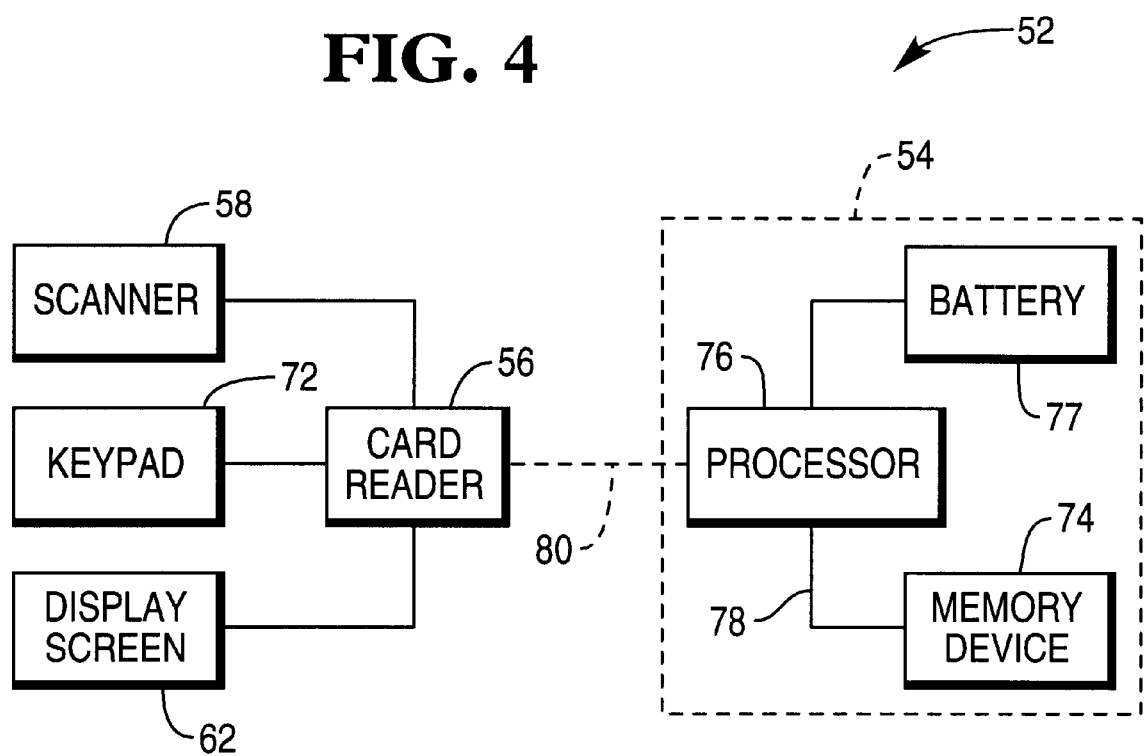
FIG. 4 is a simplified block diagram of the portable, hand-held scanner device of FIG. 1.

Referring now to FIG. 4, there is shown a simple block diagram of the hand-held scanner device 52. The smart card 54 includes a processor 76, a battery 77, and a card memory device 74. The processor 76 is electrically coupled to the battery 77 so as to provide power to the processor 76 along with the other components associated with the hand-held scanner device 52 (e.g. the bar code scanner 58, the display screen 62, and the card memory device 74). The processor 76 is coupled to the card memory device 74 via a data communication line 78. Moreover, the processor 76 is electrically coupled to the smart card reader 56 and hence the bar code scanner 58, the display screen 62, and the keypad 72 via a data interface 80 when the smart card 54 is positioned within the slot 60 of the smart card reader 56. Hence, the processor 76 of the smart card 54 functions as the processing unit of the hand-held scanner device 52. Moreover, the card memory device 74 has stored therein the application software required for operation of the hand-held scanner device 52.

The card memory device 74 also maintains an electronic transaction table which includes a record of the product identification code associated with each item that is scanned during the customer's use of the hand-held scanner device 52 while shopping in the shopping area of the retailer's store. For example, if the customer scans a can of soup with the hand-held scanner device 52 while placing the soup into his or her shopping cart, a record including the product information associated with the can of soup (e.g. the product identification code) is recorded in the transaction table in the card memory device 74.

It should therefore be appreciated that the sum of each of the items recorded in the transaction table (1) minus any reductions (e.g. coupons), and (2) plus any applicable taxes is the amount that the customer pays for his or her transaction. As shall be discussed below in more detail, once the customer has finished scanning all of his or her items for purchase in the shopping area of the retailer's store, the records stored in the transaction table maintained in the card memory device 74 are downloaded to the self-service checkout terminal 10 such that the customer's transaction may be completed (e.g. the customer may tender payment for his or her items for purchase).

Hence, during operation, if a customer desires to purchase an item (e.g. a bag of pretzels), the customer first waves or otherwise passes the bar code scanner 58 of the hand-held scanner device 52 across the bar code printed on the bag of pretzels. Thereafter, if the hand-held scanner device 52 captures or otherwise reads the bar code, an item-entered control signal indicative of the product identification code associated with the scanned bar code is generated and sent to the processor 76 via the interface 80. Thereafter, the processor 76 communicates with the card memory device 74 such that a record including the product identification code associated with the pretzels is then stored in the transaction table maintained in the card memory device 74.

It should be appreciated that the product identification code may then be utilized to provide information associated with the scanned item to the customer. For example, if the product identification code includes the price of the item, the price of the item may be displayed on the display screen 62 of the hand-held scanner device 52. Moreover, the card memory device 74 may also be configured to maintain a product lookup database which includes product information (e.g. description and price) associated with each item sold by the retailer. Hence, if the customer scans a can of soup, the product identification code read from the bar code on the can of soup may be utilized to retrieve product information (e.g. description and price) from the product lookup database. A record including such product information, along with the corresponding product identification code, may then be stored in the transaction table maintained by the card memory device 74.

Hence, during operation of the scan-in-the-aisle retail system 50, the customer shops in the shopping area of the retailer's store and selects his or her items for purchase. As the customer selects each item for purchase, the customer scans the bar code on the item with the hand-held scanner device 52 prior to placing the item into a shopping cart 21 or a hand basket 23 (see FIG. 2). A record corresponding to each scanned item is stored in the transaction table maintained in the card memory device 74 of the smart card 54. Once the customer has finished selecting all of his or her items for purchase (and hence has scanned all of the same with the hand-held scanner device 52), the customer advances to the checkout area of the store in order to tender payment for his or her items for purchase with the self-service checkout terminal 10.

As shown in FIG. 3, the self-service checkout terminal 10 includes a status light device 11, a product scale 12, a scanner 14, a cart/basket scale 18, a smart card reader 30, a display monitor 32, a keypad 34, a printer 36, and a processing unit 26. The smart card reader 30, the display monitor 32, the keypad 34, and the printer 36 may be provided as separate components, or alternatively may preferably be provided as components of an automated teller machine (ATM) 24.

The self-service checkout terminal 10 also includes a bagwell 38 for accommodating one or more grocery bags (not shown), a base 40 having a counter 42 secured thereto, and a basket shelf 44. The counter 42 defines an arcuate surface as shown in FIG. 3. Such an arcuate surface allows the scanner 14 to be positioned relatively close or otherwise proximate the ATM 24 and hence the components associated therewith (e.g. the smart card reader 30). Such a configuration facilitates a customer's use of the self-service checkout terminal 10.

The bagwell 38 is disposed between the scanner 14 and the ATM 24 as shown in FIG. 1. The bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 3. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. The display monitor 32 is preferably a known touch screen monitor which can generate data signals when certain areas of the screen are touched by a customer.

The cart/basket scale 18 is positioned in order to determine the weight of an item or items positioned in either (1) a shopping cart 21 positioned on a cart unloading platform 46, and/or (2) a shopping hand basket 23 positioned on the basket shelf 44. In particular, if a customer removes an item from either the shopping cart 21 or the shopping hand basket 23 in order to scan or otherwise enter the item into the self-service checkout terminal 10, the cart/basket scale 18 may be used to determine if the shopping cart 21 or shopping hand basket 23 is empty by comparing the measured weight of the shopping cart 21 or shopping hand basket 23 to known, stored weight values associated with empty carts and hand baskets, respectively. It should be appreciated that the cart/basket scale 18 may be embodied as two separate scales (i.e. a first scale for detecting weight changes on the cart unloading platform 46 and second scale for detecting weight changes on the basket shelf 44), or may preferably be embodied as a single, integrated weight scale which is mechanically coupled to both the cart unloading platform 46 and the basket shelf 44.

The status light device 11 is provided in order to notify store personnel, such as a customer service manager, that intervention into the customer's transaction is needed. In particular, the status light device 11 may display a first colored light in order to notify store personnel that intervention is needed prior to the end of the customer's transaction. Alternatively, the status light device 11 may display a second colored light in order to notify store personnel that intervention is needed immediately.

The self-service checkout terminal also includes a security device 48. The security device 48 provides security from improprieties, such as theft, during operation of the self-service checkout terminal 10. As shown in FIG. 3, the security device 48 may be embodied as a scale which monitors the weight of items placed in the bagwell 38 (i.e. into one of the grocery bags) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the scale 48 may be utilized to monitor the ingress and egress of items into and out of the bagwell 38 along with onto and off of the counter 42. Such monitoring is particularly useful for preventing items which have not been scanned from being placed into a grocery bag.

The security device 48 may also be embodied as numerous other types of devices. For example, the security device 48 may be embodied as a digital video system which captures video images associated with movement or placement of items throughout the area proximate the self-service checkout terminal 10. Moreover, the security device 48 may be embodied as a light curtain device which is 'tripped' when items are placed into or removed from the bagwell 38 or placed onto or off of the counter 42. As shall be discussed below in more detail, the security device 48 provides security during operation of the self-service checkout terminal 10 associated with an audit of the customer's transaction.

Figure 5:
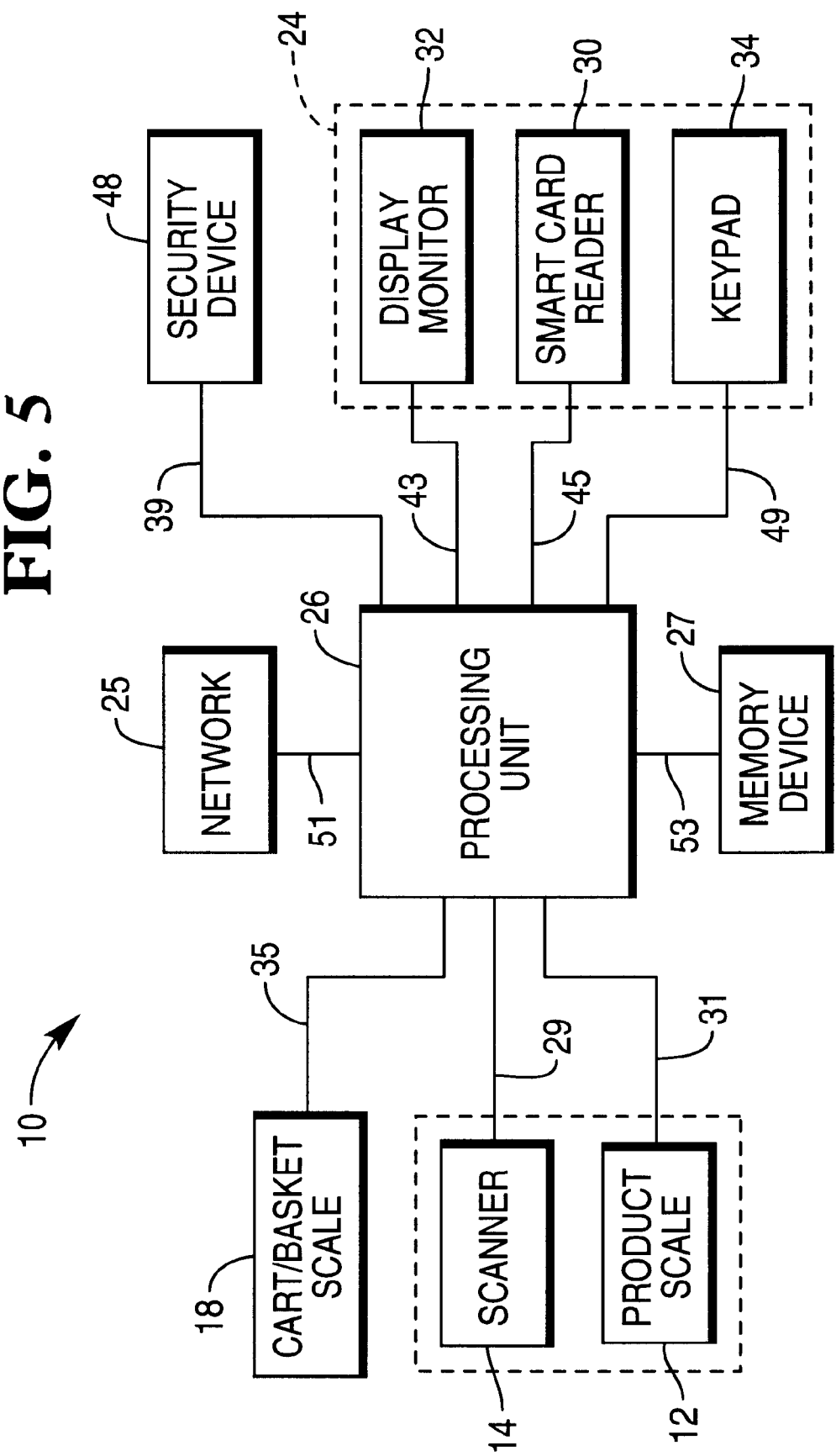
FIG. 5 is a simplified block diagram of the self-service checkout terminal of FIG. 3.

Referring now to FIG. 5, there is shown a simplified block diagram of the self-service checkout terminal 10. The processing unit 26 is electrically coupled to the product scale 12, the scanner 14, the cart/basket scale 18, the smart card reader 30, the display monitor 32, the keypad 34, and the security device 48. The processing unit 26 is also electrically coupled to a network 25 and a terminal memory device 27.

The processing unit 26 monitors output signals generated by the scanner 14 via a communication line 29. In particular, when the customer scans an item which includes a bar code across the scanning windows 14a, 14b, an output signal indicative of the product identification code encoded in the bar code is generated on the communication line 29.

The processing unit 26 is coupled to the product scale 12 via a data communication line 31. In particular, when an item is placed thereon, the product scale 12 generates an output signal on the data communication line 31 indicative of the weight of the item.

The processing unit 26 is coupled to the cart/basket scale 18 via a data communication line 35. In particular, the cart/basket scale 18 generates an output signal on the data communication line 35 indicative of the weight of the shopping cart 21 positioned on the unloading platform 46 or the shopping hand basket 23 positioned on the basket shelf 44.

The processing unit 26 communicates with the display monitor 32 through a data communication line 43. The processing unit 26 generates output signals on the data communication line 43 which cause various instructional messages to be displayed on the display monitor 32. The display monitor 32 may include known touch screen technology which can generate output signals when the customer touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, instructional messages may be generated with a voice generating device (not shown) or an audible tone generating device (not shown).

The security device 48 is coupled to the processing unit 26 through a data communication line 39. Hence, when the security device 48 detects a security event (e.g. a weight increase on a scale or an interruption of a light curtain), the security device 48 communicates data indicative of the security event on the data communication line 39.

The keypad 34 is coupled to the processing unit 26 through a data communication line 49. The keypad 34 may include one or more of a known keypad or a touch pad.

Moreover, the smart card reader 30 is coupled to the processing unit through a data communication line 45. The smart card reader 30 may include any known smart card reader, and may also be configured to read magnetic strip-type cards including credit, debit, and/or loyalty cards. Hence, when a customer approaches the self-service checkout terminal 10, the customer may remove the smart card 54 from the slot 60 of the hand-held scanner device 52 and thereafter insert the smart card 54 into the smart card reader 30. As shall be discussed below in more detail, the smart card reader 30 may be utilized to download or otherwise transfer information such as the records stored in the transaction table maintained in the card memory device 74 of the smart card 54.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to obtain information such as pricing information associated with an item being scanned or otherwise entered, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the terminal memory device 27 via a data communication line 53. The terminal memory device 27 is provided to maintain an electronic transaction table which includes a record of the product information associated with each item that is scanned, weighed, or otherwise entered during the customer's use of the self-service checkout terminal 10. For example, if the customer scans a can of soup, the description of the soup and the pricing information associated therewith is recorded in the transaction table in the terminal memory device 27. Similarly, if the customer weighs a watermelon with the product scale 12 and then enters a product lookup code associated with watermelon via the keypad 34, product information associated with the watermelon is recorded in the transaction table. Moreover, if a customer enters a coupon or voucher, the information associated therewith would also be recorded in the transaction table.

It should be appreciated that the above-described configuration allows the self-service checkout terminal 10 to be utilized to perform an audit of the customer's transaction. In particular, in order to reduce the number of occasions in which a customer intentionally or unintentionally commits an impropriety while itemizing his or her items for purchase with the hand-held scanner device 52 in the shopping area of the retailer's store, the self-service checkout terminal 10 is configured to selectively require the customer's transaction to be audited. More specifically, an audit procedure may be conducted for a predetermined number of visits after the customer initially registers with the retailer. For example, the first three times a new customer operates the scan-in-the-aisle retail system 50, the customer may be subjected to an audit when the customer attempts to tender payment for his or her items for purchase. During such an audit, the customer removes each of his or her items from purchase from the shopping cart 21 or the shopping basket 23 and thereafter scans or otherwise enters each item into the self-service checkout terminal 10 by use of the scanner 14 or other component associated with the terminal 10. As discussed below, the self-service checkout terminal 10 may then make a determination as to the accuracy of the customer's transaction. It should be appreciated that during such an audit procedure, the security system (e.g. the security device 48) associated with the self-service checkout terminal 10 assures proper entry of each of the customer's items for purchase into the self-service checkout terminal 10.

Moreover, after the initial number of audits (e.g. the first three uses of the scan-in-the-aisle retail system 50), the customer may be subjected to an audit on a random basis. For example, each time the customer attempts to tender payment after use of the hand-held scanner device 52, the customer may have a one-in-seven chance of randomly being selected for an audit in which the customer is required to confirm the accuracy of the his or her transaction by scanning each of his or her items into the self-service checkout terminal 10.

Hence, in the case of when the self-service checkout terminal 10 is utilized to perform an audit of the customer's transaction, the records stored in the transaction table maintained in the terminal memory device 27 may be compared to the records stored in the transaction table maintained in the card memory device 74 in order to determine any discrepancies therebetween. In particular, during an audit of the customer's transaction, the records associated with the transaction table maintained in the card memory device 74 are first downloaded by placing the smart card 54 into the card reader 30. Thereafter, an electronic copy of the downloaded records associated the transaction table maintained in the card memory device 74 (i.e. the records associated with items scanned by the customer with the hand-held scanner device 52 while the customer was shopping in the shopping area of the retailer's store) is stored in the terminal memory device 27. Thereafter, a second transaction table is created during auditing of the customer's transaction. In particular, if the customer's transaction is audited, the customer must take each of his or her items and scan or otherwise enter the items into the self-service checkout terminal 10. During such entry of items, a second transaction table is created which has stored therein a record corresponding to each item scanned or otherwise entered into the self-service checkout terminal 10. Once the customer has entered all of his or her items for purchase thereby completing the audit, the set of records of the downloaded transaction table are compared to the set of records of the transaction table created during entry of items into the self-service checkout terminal 10. If the two sets of records match one another, the self-service checkout terminal 10 allows the customer to tender payment for his or her transaction thereby completing the customer's transaction. What is meant herein by the terms "match" or "matches" is that the records contained in a first transaction table equal, or are within a predetermined tolerance range, of the records included in a second transaction table. For example, the set of records stored in the transaction table maintained in the card memory device 74 matches the set of records contained in the transaction table created during entry of items into the self-service checkout terminal 10 (e.g. during an audit) if the two sets of records are identical.

Referring now to FIG. 6, there is shown a flowchart which sets forth a general procedure 150 for completing a retail transaction with the scan-in-the-aisle retail system 50. When the customer enters the retailer's store and obtains one of the hand-held scanner devices 52, the retail system 50 is in an idle state (step 152). An initialization step 154 is executed prior to entering items for purchase. In particular, the customer may have to check in at a central area of the retailer's store in order to be issued a hand-held scanner device 52. Such an initialization procedure 154 may include placing a customized smart card 54 into the slot 60 of the hand-held scanner device 52. Such a customized smart card 54 may have demographic information associated with the customer stored therein in addition to the other electronic files discussed above (e.g. the application software for operation of the hand-held scanner device 52).

At the completion of the initialization step 154, the routine 150 advances to an itemization step 156 where the customer enters individual items for purchase by scanning the items with the hand-held scanner device 52. In particular, as the customer advances through the shopping area of the retailer's store, the customer scans each item for purchase as the customer selects the item. For example, prior to placing each item into a shopping cart 21 or a shopping hand basket 23, the customer may scan the bar code associated with the item with the hand-held scanner device 52.

At the completion of the itemization step 156, the routine 150 advances to a finalization step 158 in which the customer approaches the self-service checkout terminal 10 such that (1) it may be determined if an audit of the customer's transaction is needed, (2) a grocery receipt is printed by the printer 36, and (3) payment is tendered by either inserting currency into a cash acceptor (not shown) or charging a credit card or debit card account. It should be appreciated that in the case of when a customer inserts currency into the cash acceptor, the self-service checkout terminal 10 may provide change via a currency dispenser (not shown) and a coin dispenser (not shown). Moreover, it should be appreciated that in the case of when an audit of the customer's transaction is needed, the self-service checkout terminal 10 may be operated to complete such a transaction. After completion of the finalization step 158, the routine 150 returns to step 152 in which the retail system 50 remains in the idle condition until a subsequent customer initiates a checkout transaction.

Figure 7:
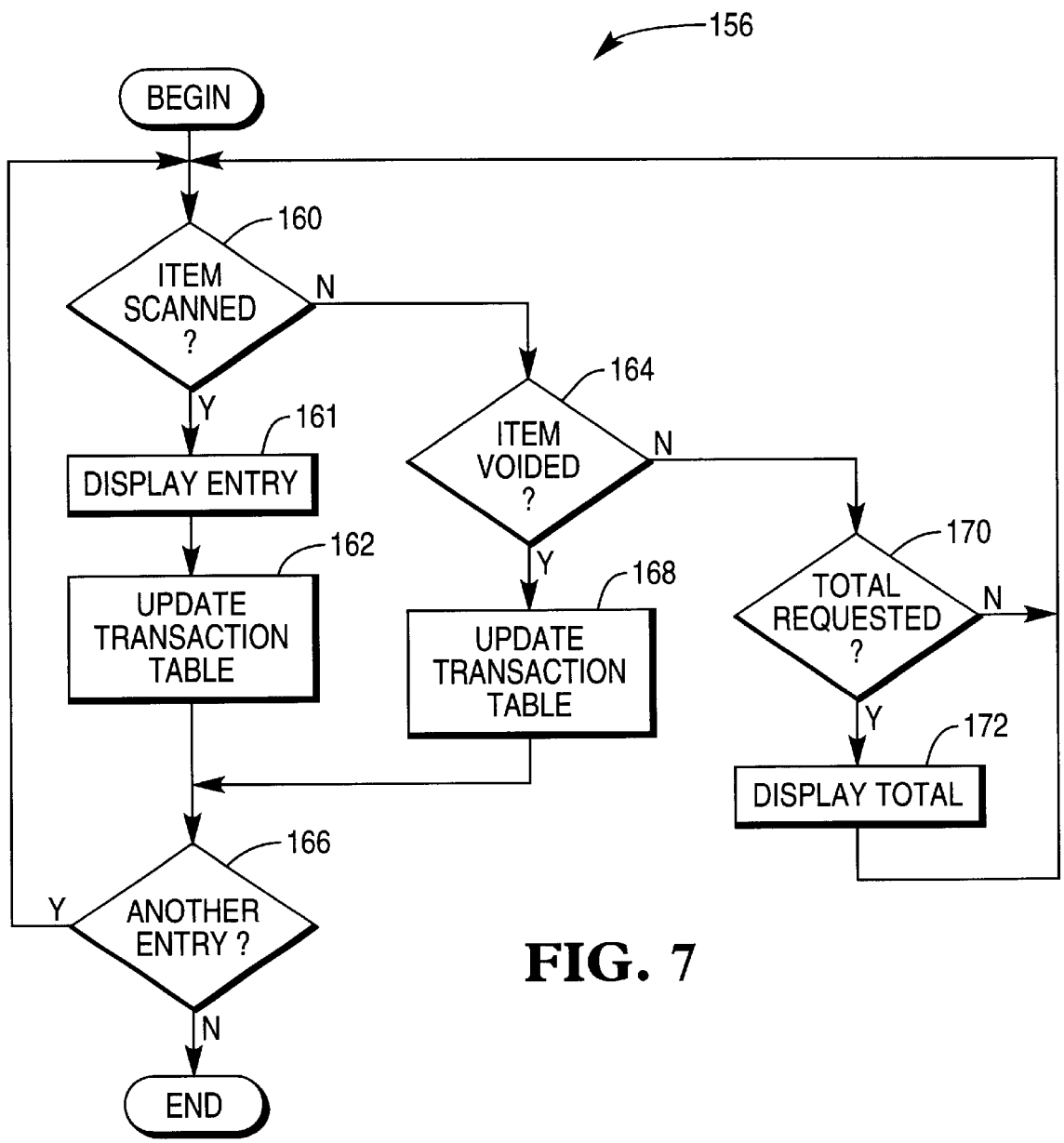
FIG. 7 is a flowchart which shows the itemization step of the general procedure of FIG. 6 in greater detail.

Referring now to FIG. 7, there is shown a flowchart setting forth the itemization step 156 in greater detail. After the initialization step 154 (see FIG. 6) is completed, the routine 156 advances to step 160 in which the processor 76 associated with the hand-held scanner device 52 determines whether an item has been scanned or otherwise entered into the hand-held scanner device 52. In particular, the processor 76 determines if the bar code scanner 58 has successfully read or otherwise captured the bar code associated with an item. More specifically, the bar code scanner 58 generates an output signal which is sent to the processor 76 once the bar code scanner 58 successfully reads the bar code associated with an item. If an item is successfully entered into the hand-held scanner device 52, an item-entered control signal is generated and the routine 156 advances to step 161. If an item is not successfully entered into the hand-held scanner device 52, the item-entered control signal is not generated, and the routine 156 advances to step 164.

In step 161, the processor 76 causes a visual indication of the product identification code of the scanned item to be displayed. In particular, the processor 76 communicates with the display screen 62 so as to display a visual indication of the product identification code of the scanned item on the display screen 62. It should be appreciated that product information (e.g. description and price) of the scanned item may also be displayed. The routine 156 then advances to step 162.

In step 162, the processor 76 adds a record of the item entered in step 160 to the transaction table maintained in the card storage device 74 of the smart card 54. In particular, the processor 76 generates an output signal which causes the transaction table maintained in the card memory device 74 to be updated to include a record of the product identification code associated with the scanned item. As discussed above, it should be appreciated that the transaction table maintained in the card memory device 74 may also be updated to include production information (e.g. description and price) associated with the scanned item if such product information is either encoded in the bar code or available in a product lookup database stored in the card memory device 74. It should also be appreciated that the contents of the transaction table are used by the self-service checkout terminal 10 for purposes of generating a grocery bill and receipt at the end of the customer's transaction. The routine 156 then advances to step 166.

In step 166, the processor 76 monitors output from the keypad 72 in order to determine whether there are more items or coupons to be entered. In particular, the customer is instructed to touch a particular key or series of keys associated with the keypad 72, when the customer has completed scanning all of his or her items for purchase with the hand-held scanner device 52.

If a particular output is detected from the keypad 72, the processor - 5 76 determines that the itemization step 156 is complete and the routine 156 then ends thereby advancing the routine 150 (see FIG. 6) to the finalization step 158 in order to determine if an audit of the customer's transaction is required and thereafter allow the customer to tender payment for his or her items for purchase. If a particular output is not detected from the keypad 72, the processor 76 determines that the customer has additional items for purchase, and the routine 156 loops back to step 160 to monitor entry of subsequent items.

Returning now to step 160, if an item is not successfully entered into the hand-held scanner device 52, the routine 156 advances to step 164. In step 164, the processor 76 determines if the customer has voided entry of an item. In particular, the processing unit 26 monitors output from the keypad 72 in order to determine if the customer has pressed the void key 66 in order to void a particular item. If the customer voids an item, the routine 156 advances to step 168. If the customer does not void an item, the routine 56 advances to step 170.

In step 168, the processor 76 removes a record of the item voided in step 164 from the transaction table maintained in the card storage device 74 of the smart card 54. In particular, the processor 76 generates an output signal which causes the transaction table maintained in the card memory device 74 to be updated to remove the product identification code associated with the voided item. The routine 156 then advances to step 166 to determine if additional items are to be entered by the customer in the manner previously discussed.

Returning now to step 164, if the customer does not void an item, the routine 56 advances to step 170. In step 170, the processor 76 determines if the customer desires a visual indication of the total of his or her transaction. In particular, the processing unit 26 monitors output from the keypad 72 in order to determine if the customer has pressed the total key 68 in order to determine the current total dollar amount of the customer's transaction. If the customer desires a visual indication of the total dollar amount of his or her items for purchase, the routine 156 advances to step 172. If the customer does not desire a visual indication of the total dollar amount of his or her transaction, the routine 156 loops back to step 160 to monitor entry of subsequent items.

In step 172, the processor 76 causes a visual indication of the total dollar amount of the customer's transaction (i.e. the total dollar amount of the customer's items for purchase) to be displayed. In particular, the processor 76 communicates with the display screen 62 so as to display a visual indication of the total dollar amount of the customer's transaction on the display screen 62.

Figure 8:
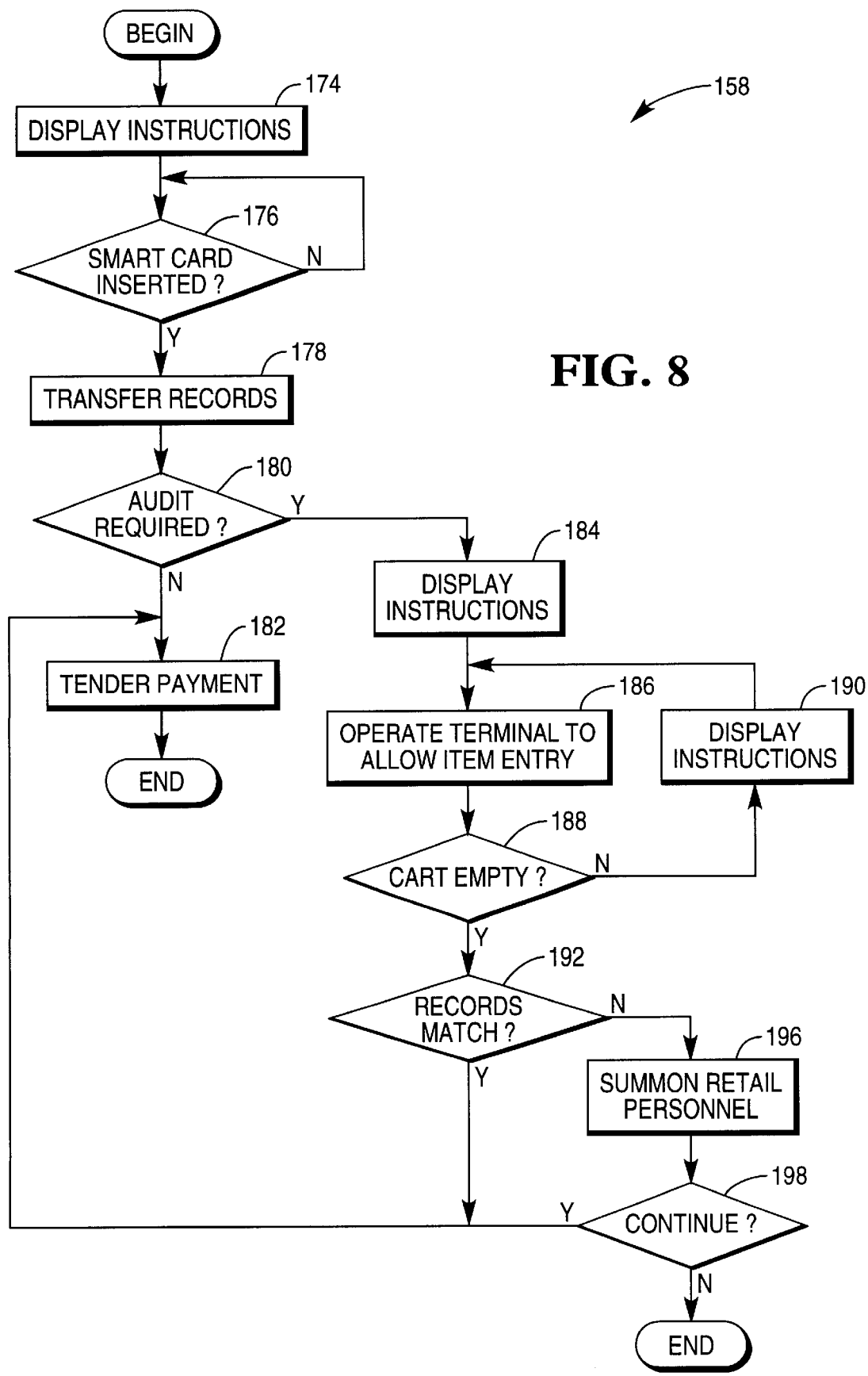
FIG. 8 is a flowchart which shows the finalization step of the general procedure of FIG. 6 in greater detail.

As discussed above, if subsequent to step 166, the routine 156 ends, the routine 150 (see FIG. 6) advances to finalization step 158. Referring now to FIG. 8, there is shown a flowchart setting forth the finalization step 158 in greater detail. After the itemization step 156 (see FIGS. 6 and 7) is completed, the routine 158 advances to step 174 in which the processing unit 26 associated with the self-service checkout terminal 10 causes a message to be displayed on the display monitor 32 which instructs the customer to dock or otherwise position the hand-held scanner device 52 in a docking receptacle. In particular, the message displayed on the display monitor 32 instructs the customer to remove the smart card 54 from the slot 60 of the hand-held scanner device 52 and thereafter insert the smart card 54 into the smart card reader 30 of the self-service checkout terminal 10. The routine 158 then advances to step 176.

In step 176, the processing unit 26 determines if the customer has removed the smart card 54 from the hand-held scanner device 52 and thereafter inserted the smart card 54 into the smart card reader 30. In particular, the smart card reader 30 generates a card-inserted control signal which is sent to the processing unit 26 via the data communication line 45 when the smart card reader 30 detects insertion of the smart card 54. If the customer inserts the smart card 54 into the smart card reader 30, a card-inserted control signal is generated and the routine 158 advances to step 178. If the customer does not insert the smart card 54 into the smart card reader 30, the routine 158 loops back to monitor subsequent insertion of the smart card 54.

In step 178, the processing unit 178 causes the records stored in the transaction table maintained in the card memory device 74 of the smart card 54 to be downloaded. In particular, the processing unit 178 operates the smart card reader 30 such that an electronic copy of the records stored in the transaction table maintained in the card memory device 74 of the smart card 54 is transferred to the terminal memory device 27 (see FIG. 5) associated with the self-service checkout terminal 10. It should be appreciated that the records stored in the transaction table maintained in the card memory device 74 of the smart card 54 are indicative of the items scanned by the customer with the hand-held scanner device 52 while the customer was shopping in the shopping area of the retailer's store. Once a copy of the records stored in the transaction table maintained in the card memory device 74 of the smart card 54 is transferred to the terminal memory device 27 associated with the self-service checkout terminal 10, a transfer-complete control signal is generated and the routine 158 advances to step 180.

In step 180, the processing unit 26 determines if it is necessary to audit the customer's transaction. In particular, as discussed above, in order to reduce the number of occasions in which a customer intentionally or unintentionally commits an impropriety while itemizing his or her items for purchase with the hand-held scanner device 52 in the shopping area of the retailer's store, the self-service checkout terminal 10 is configured to selectively require the customer's transaction to be audited. More specifically, an audit procedure may be conducted for a predetermined number of visits after the customer initially registers with the retailer. For example, the first three times a new customer operates the scan-in-the-aisle retail system 50, the customer may be subjected to an audit when the customer attempts to tender payment for his or her items for purchase. During such an audit, the customer removes each of his or her items from purchase from the shopping cart 21 or the shopping basket 23 and thereafter scans or otherwise enters each item into the self-service checkout terminal 10 by use of the scanner 14 or other component associated with the terminal 10. It should be appreciated that during such an audit procedure, the security system (e.g. the security device 48) associated with the self-service checkout terminal 10 assures proper entry of each of the customer's items for purchase into the self-service checkout terminal 10.

Moreover, after the initial number of audits (e.g. the first three uses of the scan-in-the-aisle retail system 50), the customer may be subjected to an audit on a random basis. For example, each time the customer attempts to tender payment after use of the hand-held scanner device 52, the customer may have a one-in-seven chance of randomly being selected for an audit in which the customer is required to confirm the accuracy of the his or her transaction by scanning each of his or her items into the self-service checkout terminal 10. Hence, in step 180, if the customer's transaction is not subjected to an audit procedure, a no-audit control signal is generated and the routine 158 advance to step 182. However, if the customer's transaction is subject to an audit, an audit-required control signal is generated and the routine 158 advances to step 184.

In step 182, the self-service checkout terminal 10 is operated so as to allow the customer to tender payment for his or her items for purchase. In particular, the processing unit 26 operates the self-service checkout terminal 10 such that payment may be tendered by the customer by either inserting currency into a cash acceptor (not shown) or charging a credit card or debit card account. It should be appreciated that in the case of when a customer inserts currency into the cash acceptor, the self-service checkout terminal 10 may provide change via a currency dispenser (not shown) and a coin dispenser (not shown). Thereafter, a grocery receipt is printed by the printer 36 in order to generate a record of the customer's transaction. After payment has been tendered, the finalization routine 158 then ends thereby causing the routine 150 (see FIG. 6) to return to step 152 in which the retail system 50 remains in the idle condition until a subsequent customer initiates a checkout transaction.

Returning now to step 180, if the customer's transaction is subject to an audit, an audit-required control signal is generated and the routine 158 advances to step 184. In step 184, the processing unit 26 causes a message to be displayed on the display monitor 32 which (1) informs the customer that his or her transaction requires an audit, and (2) instructs the customer to unload each of his or her items from the shopping cart 21 or the shopping hand basket 23 in order to scan or otherwise enter each item into the self-service checkout terminal 10. The routine 158 then advances to step 186.

In step 186, the self-service checkout terminal 10 is operated to allow the customer to enter his or her items for purchase. In particular, the processing unit 26 operates the self-service checkout terminal 10 such that the customer may enter individual items for purchase by scanning the items across the scanner 14. Moreover, the customer may enter items, such as produce items or the like, by weighing the items with the product scale 12, and thereafter entering a product lookup code associated with the item via either the keypad 34 or by touching a particular area of the display monitor 32. Further, the customer may enter an item by manually entering the product identification code associated with the item via use of the keypad 34. It should be appreciated that when each item is entered into the self-service checkout terminal 10, a record corresponding to the item is added to a transaction table maintained in the terminal memory device 27. As shall be discussed below, the records in the transaction table corresponding to items entered into the self-service checkout terminal 10 during the audit associated with the customer's transaction may be compared to the records in the transaction table created during use of the hand-held scanner device 52 in the shopping area of the retailer's store (i.e. during the itemization step 156) in order to determine accuracy of the customer's transaction. Once the customer has entered each of his or her items for purchase into the self-service checkout terminal 10, the routine 158 advances to step 188.

In step 188, the processing unit 26 determines if the customer's shopping cart 21 or shopping hand basket 23 is empty or otherwise devoid of items. In particular, the processing unit 26 communicates with the cart/basket scale 18 in order to determine the measured weight of the shopping cart 21 or the shopping hand basket 23. Thereafter, the processing unit 26 compares the measured weight of the shopping cart 21 or the shopping hand basket 23 to known, stored weight values in order to determine if the shopping cart 21 or the shopping hand basket 23 is empty. It should be appreciated that such known, stored weight values may be average values (e.g. an average of all of the retailer's carts or hand baskets), or may be a weight value particular to the given shopping cart 21 or shopping hand basket 23 being weighed by the cart/basket scale 18. Hence, in step 188, if the shopping cart 21 or the shopping hand basket 23 is not empty, an items-present control signal is generated and the routine 158 advances to step 190. However, if the shopping cart 21 or the shopping hand basket 23 is empty or otherwise devoid of items, a cart-empty control signal is generated and the routine 158 advances to step 192.

In step 190, the processing unit 26 causes a message to be displayed on the display monitor 32 which (1) informs the customer that his or her shopping cart 21 or shopping hand basket 23 is not empty, and (2) instructs the customer to enter the remaining items into the self-service checkout terminal 10. The routine 158 then loops back to step 186 to monitor subsequent entry of the remaining items into the terminal 10.

Returning back to step 188, if the shopping cart 21 or the shopping hand basket 23 is empty or otherwise devoid of items, a cart-empty control signal is generated and the routine 158 advances to step 192. In step 192, the processing unit 26 determines accuracy of the customer's transaction. In particular, the processing unit 26 communicates with the terminal memory device 27 in order to compare the records associated with the transaction table downloaded from the hand-held scanner device 52 (i.e. the transaction table generated during entry of items with the hand-held scanner device 52 in the shopping area of the retailer's store during the itemization step 156) with the records associated with the transaction table generated during entry of items into the self-service checkout terminal 10 during the audit procedure (i.e. entry of items during step 186). If the two sets of records match, an audit-passed control signal is generated and the routine advances to step 182 to allow the customer to tender payment for his or her items for purchase in the manner previously discussed. If the two sets of records do not match, an audit-failed control signal is generated and the routine 158 advances to step 196.

In step 196, the self-service checkout terminal 10 summons retail personnel in order to investigate any discrepancies or inaccuracies in the customer transaction. In particular, the processing unit 26 generates a personnel control signal which causes an indicator device such as the status light device 11 to be actuated so as to inform retail personnel such as a customer service manager that the customer's transaction has failed the audit. Thereafter, the routine 158 advances to step 198.

In step 198, the processing unit 26 determines if the customer's transaction is allowed to continue. In particular, once the customer service manager has investigated the customer's transaction, the customer service manager enters a code into the keypad 34 or the touch screen associated with the display monitor 32 if the customer's transaction is allowed to continue. However, if the customer's transaction is not allowed to continue (e.g. the customer service manager determines that the customer is trying to commit an intentional impropriety such as theft), the customer service manager enters a different code into the keypad 34 or the touch screen associated with the display monitor 32 thereby canceling the customer's transaction. Hence, in step 198, if the customer's transaction is allowed to continue, the routine 158 advances to step 182 in order to allow the customer to tender payment for his or her items for purchase in the manner previously discussed. However, if the customer's transaction is not allowed to continue, the finalization routine 158 then ends thereby causing the routine 150 (see FIG. 6) to return to step 152 in which the retail system 50 remains in the idle condition until a subsequent customer initiates a checkout transaction.

Hence, as described herein, the scan-in-the-aisle retail system 50 has numerous advantages over retail systems which have heretofore been designed. For example, the hand-held scanner device 52 of the retail system 50 is small in size, light in weight, and constructed of inexpensive components relative to hand-held scanner devices which have heretofore been designed. Moreover, by allowing a customer to perform a "self-audit" by use of the self-service checkout terminal 10 to perform a required audit procedure, the retail system 50 provides a customer with level of "trust" relative to heretofore designed systems in which the audit procedure is performed at an assisted checkout terminal by a retail clerk.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, it should be appreciated that although the self-service checkout terminal 10 is herein described as being utilized to perform an audit procedure subsequent to itemization of a customer's items for purchase with the hand-held scanner device 52, and has significant advantages thereby in the present invention, certain of such advantages may be had by use of other types of hand-held scanner devices. For example, the self-service checkout terminal 10 may be equipped with a docking receptacle which allows known, commercially available hand-held scanner devices to be docked therein so as to download information stored in the memory device associated with the hand-held scanner device in order to determine if an audit of the customer's transaction is required.

Moreover, the self-service checkout terminal 10 may be configured to allow a customer to conduct an audit of his her transaction which was performed with a hand-held scanner device which has wireless communication capability. In such a situation, records associated with scanned items are not stored in a memory device included in the hand-held scanner device, but rather are instead communicated to the store's network for storage thereof via a wireless transmission. Once the customer finishes itemizing his or her items for purchase, the records associated with the customer's transaction are downloaded from the store's network to the self-service checkout terminal 10 in order to determine if an audit is required in the manner described above.

What is claimed is:

1. A method of operating a retail system so as to allow a customer to perform a retail transaction, said retail system having (i) a hand-held scanner device, and (ii) a self-service checkout terminal, comprising the steps of:

storing a first number of records corresponding to a number of items in a scanner memory device of said hand-held scanner device when said customer scans said number of items with said hand-held scanner device;

transferring said first number of records from said scanner memory device to a terminal memory device of said self-service checkout terminal and generating a transfer-complete control signal in response thereto;

determining whether said retail transaction of said customer is to be audited or not be audited in response to generation of said transfer-complete control signal;

generating an audit-required control signal if said retail transaction of said customer is to be audited; and operating said self-service checkout terminal so as to allow said customer to enter said number of items into said self-service checkout terminal in response to generation of said audit-required control signal.

2. The method of claim 1, further comprising the steps of:

generating a no-audit control signal if said retail transaction of said customer is not to be audited; and operating said self-service checkout terminal so as to allow said customer to tender payment for said number of items in response to generation of said no-audit control signal.

3. The method of claim 1, further comprising the steps of:

storing a second number of records corresponding to said number of items in said terminal memory device of said self-service checkout terminal when said customer enters said number of items into said self-service checkout terminal;

comparing said first number of records to said second number of records; and generating an audit-passed control signal if said second number of records matches said first number of records.

4. The method of claim 3, further comprising the step of:

operating said self-service checkout terminal so as to allow said customer to tender payment for said number of items in response to generation of said audit-passed control signal.

5. The method of claim 3, further comprising the steps of:

generating an audit-failed control signal if said second number of records does not match said first number of records;

generating a personnel control signal in response to generation of said audit-failed control signal; and actuating an indicator device so as to summon retail personnel in response to generation of said personnel control signal.

6. The method of claim 3, wherein said self-service checkout terminal has a cart scale associated therewith, further comprising the steps of:

determining weight of a grocery cart and generating a cart-empty control signal if said grocery cart is devoid of items; and operating said self-service checkout terminal so as to allow said customer to tender payment for said number of items in response to generation of said cart-empty control signal.

7. A retail system for allowing a customer to perform a retail transaction, comprising:

a hand-held scanner device having a scanner memory device associated therewith, said hand-held scanner being configured to store a first number of records corresponding to a number of items in said scanner memory device when said customer scans said number of items with said hand-held scanner device; and a self-service checkout terminal having (i) a docking receptacle for docking said hand-held scanner device, (ii) a processing unit electrically coupled to said scanner memory device when said hand-held scanner device is positioned in said docking receptacle, and (iii) a terminal memory device electrically coupled to said processing unit, wherein said terminal memory device has stored therein a plurality of instructions which, when executed by said processing unit, causes said processing unit to:

(a) transfer said first number of records from said scanner memory device to said terminal memory device and generate a transfer-complete control signal in response thereto, (b) determine whether said retail transaction of said customer is to be audited or not be audited in response to generation of said transfer-complete control signal, (c) generate an audit-required control signal if said retail transaction of said customer is to be audited, and (d) operate said self-service checkout terminal so as to allow said customer to enter said number of items into said self-service checkout terminal in response to generation of said audit-required control signal.

8. The retail system of claim 7, wherein said plurality of instructions, when executed by said processing unit, further causes said processing unit to:

(a) generate a no-audit control signal if said retail transaction of said customer is not to be audited, and (b) operate said self-service checkout terminal so as to allow said customer to tender payment for said number of items in response to generation of said no-audit control signal.

9. The retail system of claim 7, wherein said plurality of instructions, when executed by said processing unit, further causes said processing unit to:

(a) store a second number of records corresponding to said number of items in said terminal memory device of said self-service checkout terminal when said customer enters said number of items into said self-service checkout terminal, (b) compare said first number of records to said second number of records; and (c) generate an audit-passed control signal if said second number of records matches said first number of records.

10. The retail system of claim 9, wherein said plurality of instructions, when executed by said processing unit, further causes said processing unit to:

operate said self-service checkout terminal so as to allow said customer to tender payment for said number of items in response to generation of said audit-passed control signal.

11. The retail system of claim 9, wherein said plurality of instructions, when executed by said processing unit, further causes said processing unit to:

generate an audit-failed control signal if said second number of records does not match said first number of records, generate a personnel control signal in response to generation of said audit-failed control signal, and actuate an indicator device associated with said self-service checkout terminal so as to summon retail personnel in response to generation of said personnel control signal.

12. The retail system of claim 9, further comprising a cart scale which is electrically coupled to said processing unit, said cart scale being configured to determine weight of a grocery cart, wherein said plurality of instructions, when executed by said processing unit, further causes said processing unit to:

(a) generate a cart-empty control signal if said grocery cart is devoid of items, and (b) operate said self-service checkout terminal so as to allow said customer to tender payment for said number of items in response to generation of said cart-empty control signal.

13. A method of operating a retail system so as to allow a customer to perform a retail transaction, said retail system having (i) a hand-held scanner device, and (ii) a self-service checkout terminal, comprising the steps of:

storing a first number of records corresponding to a number of items in a scanner memory device of said hand-held scanner device when said customer scans said number of items with said hand-held scanner device;

transferring said first number of records from said scanner memory device to a terminal memory device of said self-service checkout terminal and generating a transfer-complete control signal in response thereto;

determining whether said retail transaction of said customer is to be audited or not be audited in response to generation of said transfer-complete control signal;

generating an audit-required control signal if said retail transaction of said customer is to be audited; and operating said self-service checkout terminal so as to allow said customer to enter said number of items into said self-service checkout terminal in response to generation of said audit-required control signal;

storing a second number of records corresponding to said number of items in said terminal memory device of said self-service checkout terminal when said customer enters said number of items into said self-service checkout terminal;

comparing said first number of records to said second number of records; and generating an audit-passed control signal if said second number of records matches said first number of records.

14. The method of claim 13, further comprising the steps of:

generating a no-audit control signal if said retail transaction of said customer is not to be audited; and operating said self-service checkout terminal so as to allow said customer to tender payment for said number of items in response to generation of said no-audit control signal.

15. The method of claim 14, further comprising the step of:

operating said self-service checkout terminal so as to allow said customer to tender payment for said number of items in response to generation of said audit-passed control signal.

16. The method of claim 14, further comprising the steps of:

generating an audit-failed control signal if said second number of records does not match said first number of records;

generating a personnel control signal in response to generation of said audit-failed control signal; and actuating an indicator device so as to summon retail personnel in response to generation of said personnel control signal.

17. The method of claim 14, wherein said self-service checkout terminal has a cart scale associated therewith, further comprising the steps of:

determining weight of a grocery cart and generating a cart-empty control signal if said grocery cart is devoid of items; and operating said self-service checkout terminal so as to allow said customer to tender payment for said number of items in response to generation of said cart-empty control signal.

18. A method of operating a retail system so as to allow a customer to perform a retail transaction, said retail system having (i) a hand-held scanner device, and (ii) a self-service checkout terminal, comprising the steps of:

operating said hand-held scanner device so as to allow said customer to enter a number of items into said hand-held-scanner device;

determining whether said retail transaction of said customer is to be audited or not to be audited;

generating an audit required control signal if said retail transaction of said customer is to be audited; and operating said self-service checkout terminal so as to allow said customer to enter said number of items into said self-service checkout terminal in response to generation of said audit-required control signal.

19. The method of claim 18, further comprising the steps of:

generating a no-audit control signal if said retail transaction of said customer is not to be audited; and operating said self-service checkout terminal so as to allow said customer to tender payment for said number of items in response to generation of said no-audit control signal.

* * * * *

UNITED STATES PATENT AND TRADEMARK OFFICE
CERTIFICATE OF CORRECTION

PATENT NO.   : 6,382,357 B1
DATED        : May 7, 2002
INVENTOR(S)  : Morrison et al.

It is certified that error appears in the above-identified patent and that said Letters Patent is hereby corrected as shown below:

Title page,
Item [*] Notice, delete "0" and insert -- 8 --.

Signed and Sealed this

Thirtieth Day of August, 2005

JON W. DUDAS
*Director of the United States Patent and Trademark Office*